2,929,799
RESIN FORMING MATERIALS AND FABRIC TREATMENT

George Shiu Yim Poon, Danville, Va., assignor to Dan River Mills, Incorporated, Danville, Va., a corporation of Virginia No Drawing. Application May 14, 1956
Serial No. 584,421

10 Claims. (Cl. 260—67.6)

This invention relates to the production of wrinkle-resistant textile fabrics and to the production of products suitable for treating fabrics to provide wrinkle resistance.

A primary object of the invention is the production of wrinkle-resistant textile fabrics characterized by extremely low damage produced by retained chlorine. Another object of this invention is the provision of new chemical products which may be applied to cotton textile fabric to produce these desired results. Other objects of the invention will be apparent from the following description and the claims.

It has now been found that melamine and ethylene urea can be reacted in mol ratios of from about 11–1 to 3–1 to provide new compounds of undetermined constitution which are useful as intermediates in the production of textile treating compositions as will more fully appear hereinafter. To produce the intermediate products one may mix the desired molar proportions of melamine and ethylene urea in a high boiling point solvent which is inert to the reactants, such as ethylene glycol, and heat until a clear solution is obtained. For best results, particularly in terms of time of reaction, the heating temperature should be from about 180° C. to reflux. The reaction of melamine with ethylene urea is accompanied by the evolution of ammonia which indicates that there is a reaction between the amine groups of the melamine and the ethylene urea. This intermediate product is water-soluble but may be solidified on cooling.

Among the high boiling point solvents which may be used to carry out the reaction between melamine and ethylene urea are ethylene glycol, diethylene glycol, triethylene glycol, butylene glycol and glycerol. Preferably, these solvents are substantially anhydrous but a small amount of water will have no adverse effect as the reaction temperature is well above the boiling point of water which will therefore be removed before the reaction takes place.

These ethylene-urea-melamine reaction products are highly reactive with formaldehyde and produce stable methylol compounds when reacted with formaldehyde on the alkaline side.

Reaction of the melamine-ethylene-urea reaction product and formaldehyde may be carried out at elevated temperatures within a range of from about pH 6.5 to pH 11. However, satisfactory stability is not obtained if the reaction is carried out at the higher pH, and there is a danger of resin formation or premature polymerization at the lower pH. Preferably, the reaction with formaldehyde is carried out in the range of from about pH 7 to pH 8.5. For stability purposes the methylolated product should be finished off at a pH of from about 9–11, preferably 9.5.

These methylol compounds are highly reactive and when carried to the acid side will rapidly produce thermosetting resinous materials. The same methylol compounds are very useful for obtaining wrinkle-resistant textile fabrics having strong resistance to damage by retained chlorine.

The term ethylene urea as used in both the specification and claims is intended to mean a compound of the formula:

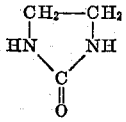

The invention will be better understood by reference to the following typical examples.

EXAMPLE I

Seventy-five (75) parts (11 mols) of ethylene urea in 30 parts of ethylene glycol were mixed with 10 parts (1 mol) of dry melamine which was slurried therein and heated at 180° C. for about ten minutes until a clear solution was obtained. This product was water soluble but solidified on cooling. The exact nature of the reaction product has not been chemically determined but its existence may be verified by the evolution of ammonia during the reaction and by the fact that the melamine goes into solution on reaction with ethylene urea whereas ti would otherwise remain substantially insoluble, i.e., it would be insoluble except in minor proportions. To the melamine-ethylene-urea reaction product there was added 165 parts (25 mols) of formalin (37% formaldehyde) and the mixture was maintained at 78° C. for ten to fifteen minutes at pH 7.5–8.0. The product was permitted to cool to room temperature and the pH was adjusted to 9.5 after which it remained stable.

EXAMPLE II

Sixty-eight (68) parts (5 mols) of ethylene urea in 30 parts of ethylene-glycol were mixed with 20 parts (1 mol) of dry melamine which was slurried therein and heated at 210° C. until clear. After cooling to about 60° C., 185 parts of formalin (14 mols of formaldehyde) was added and the temperature was kept at 78° C. for 15 minutes at pH 7.5–8.0. This product was cooled and the pH was adjusted to 9.5.

On an accelerated stability test in which the product was stored in an oven at 60° C., it remained water dilutable in any proportion to form a clear water solution even after 32 days. (Prior tests indicate that one day's storage in an oven at 60° C. is approximately equal ot a shelf life of 30 to 40 days.)

EXAMPLE III

Seventy-one (71) parts (3 mols) of ethylene urea in 30 parts of ethylene glycol were mixed with 34 parts of melamine (1 mol) and heated to about 110°–130° C. The mixture was acidified by the addition of hydrochloric acid solution, after which it was refluxed for about 3–4 hours until a clear solution was obtained. This product was cooled to 70–80° C. and adjusted to the alkaline side at about pH 7.5–8.0 using aqueous sodium hydroxide solution. Two hundred fifteen (215) parts of formalin (10 mols of formaldehyde) were added and the mixture was heated to 78° C. for 15 minutes without changing the pH. The product was cooled and adjusted to pH 9.5, after which it appeared to have almost indefinite stability.

In the aboxe examples it will be noted that the formaldehyde is added in a slight excess of the amount required to fully methylolate the melamine and the ethylene urea, had they not been reacted with one another. Obviously then, in the examples, there is a considerable excess of formaldehyde over and above the stoichiometric amount required to methylolate the reaction product of melamine and ethylene urea. It has been found that the mol ratio of formaldehyde may be varied over a relatively wide range to produce generally similar products, but an excess of formaldehyde is desirable, as it improves the stability of the product while reducing its cost.

EXAMPLE IV

A plaid cotton gingham running about 4½ yards per pound which had been previously bleached, mercerized and soured was divided into six portions, each of which was impregnated with an aqueous solution of the following formulae:

Formula 1
10% of the product of Example 1.
1% of softener.
1% of a 50% solution of monoethanolamine hydrochloride.
Balance—water.

Formula 2
10% of the product of Example I.
1% softener.
1% of a 50% solution of zinc nitrate hexahydrate.
Balance—water.

Formula 3
10% of the product of Example II.
1% softener.
1% of a 50% solution of monoethanolamine hydrochloride.
Balance—water.

Formula 4
10% of the product of Example II.
1% softener.
1% of a 50% solution of zinc nitrate hexahydrate.
Balance—water.

Formula 5
10% of the product of Example III.
1% softener.
1% of a 50% solution of monoethanolamine hydrochloride.
Balance—water.

Formula 6
10% of the product of Example III.
1% softener.
1% of a 50% solution of zinc nitrate hexahydrate.
Balance—water.

The softener used in the above formulations is an optional conventional textile softener which is the reaction product of triethyl ammonium chloride with octadecyl methyl ether.

Each of the six samples was impregnated with about 65% of its own weight of one of these formulations and dried. Each of the six impregnated samples was then divided into three portions which were cured for 70 seconds in an oven, one portion at 130° C., one portion at 150° C. and the third portion at 175° C. After curing, the samples were washed, pressed, brought to standard conditions and tested for wrinkle resistance, tear strength, tensile strength and damage from retained chlorine. All of the samples had reasonably satisfactory wrinkle resistance and the samples cured at 150° C. and 175° C. had excellent wrinkle resistant properties. The tear and tensile strength of all the samples was considered entirely satisfactory and the damage from retained chlorine was uniformly low. The samples cured at 130° C. had slightly higher damage from chlorine retention than the samples cured at 150° C. and 175° C. as each sample cured at the higher temperatures had damage of about the order of untreated fabric tested by the same procedure. (AATCC Tentative Test Method 69–52, damage from retained chlorine.)

The amount of those products used may be varied over a relatively wide range of from 5% to 50% without adversely affecting the damage from retained chlorine. As can be seen from the above examples, a reasonably strong cure is required to produce the optimum results. However, since the degree of cure is a function of time, temperature and amount of catalyst used, these factors have to be adjusted to assure uniformly good results by testing treated fabrics to be sure they are within the proper range.

It will be obvious that other modifications known in the art of treating textile fabrics for wrinkle resistance such as variation in drying technique, the addition of softeners, stiffeners, wetting agents, etc., may be made without departing from the scope of this invention.

I claim:
1. The process of producing wrinkle resistant cotton textile fabrics which are also resistant to damage from retained chlorine which comprises impregnating said fabrics with an aqueous solution containing an acidic catalyst and from about 5 to 50% of the product obtained by the process of claim 9, drying the thus impregnated fabric and heating the fabric to cure the resin.

2. The reaction product obtained by heating a mixture of reactants consisting essentially of 1 mol of melamine with from about 3 to 11 mols of ethylene urea, said heating being continued to cause reaction of the reactants accompanied by evolution of ammonia.

3. Reaction product obtained by heating from about 5 to 30 mols of formaldehyde with the reaction product claimed in claim 2.

4. The process which comprises heating a mixture consisting essentially of 1 mol of melamine and from about 3 to 11 mols of ethylene urea in the presence of a high boiling point solvent which is inert to both ingredients, at a temperature of from about 180° C. to reflux, said heating being continued to cause evolution of ammonia until a clear solution is obtained.

5. The process which comprises heating a mixture consisting essentially of 1 mol of melamine and from about 3 to 11 mols of ethylene urea in the presence of a high boiling point solvent which is inert to both ingredients, at a temperature of from about 180° C. to reflux, said solvent being selected from the group consisting of ethylene glycol, diethylene glycol, propylene glycol, butylene glycol, and glycerol, said heating being continued to cause evolution of ammonia until a clear solution is obtained.

6. The product produced in accordance with the process set forth in claim 4.

7. The process which comprises reacting 10 mols of formaldehyde with the product product by the process of claim 4.

8. The product of the process claimed in claim 7.

9. The process which comprises heating a mixture consisting essentially of melamine and from about 3 to 11 mols of ethylene urea in the presence of a high boiling point solvent which is inert to both ingredients, said heating being at a temperature of from about 180° C. to reflux and being continued to cause evolution of ammonia until a clear solution is obtained, and thereafter reacting the clear solution thus obtained with from about 5 to 30 mols of formaldehyde by adding same at between pH 6.5 and pH 11.

10. The produce produced in accordance with the process set forth in claim 9.

References Cited in the file of this patent

UNITED STATES PATENTS

| | | |
|---|---|---|
| 2,518,963 | Weaver | Aug. 15, 1950 |
| 2,690,404 | Spangler et al. | Sept. 28, 1954 |

OTHER REFERENCES

Published abstract of U.S. patent application Ser. No. 576,508, Evans et al., Nov. 1, 1949.